United States Patent [19]

Bradshaw et al.

[11] Patent Number: 4,620,858
[45] Date of Patent: Nov. 4, 1986

[54] PROCESS AND SYSTEM FOR ELIMINATION OF PAINT SOLVENT VAPORS

[75] Inventors: Norman F. Bradshaw, Surrey; Ivan Bloomer, London, both of Great Britain

[73] Assignee: Haden Schweitzer Corporation, Madison Heights, Mich.

[21] Appl. No.: 672,835

[22] Filed: Nov. 19, 1984

Related U.S. Application Data

[60] Division of Ser. No. 524,640, Aug. 19, 1983, abandoned, which is a division of Ser. No. 330,744, Dec. 14, 1981, abandoned, which is a continuation-in-part of Ser. No. 235,270, Feb. 17, 1981, abandoned, which is a continuation-in-part of Ser. No. 74,647, Sep. 12, 1979, Pat. No. 4,261,767.

[51] Int. Cl.⁴ .................. B01D 46/02; B01D 53/14
[52] U.S. Cl. ............................. 55/222; 55/89; 55/94; 55/223; 55/228
[58] Field of Search ............... 55/48, 50, 55, 89, 97, 55/195, 199–201, 223, 228, 229, 233, 259, DIG. 46; 261/118; 98/115.2

[56] References Cited

U.S. PATENT DOCUMENTS 3,618,301 11/1971 Handman ..................... 55/89
3,619,983 11/1971 Rohr ........................... 55/89
4,086,070 4/1978 Argo et al. .................... 55/97
4,257,783 3/1981 Gatjahr et al. ................. 55/97 X Primary Examiner—Charles Hart
Attorney, Agent, or Firm—Krass & Young

[57] ABSTRACT

A system and process is disclosed for eliminating paint solvents released during paint spraying operations into the circulated air including a liquid spray solvent stripper comprising a multistage absorber unit through which the exhaust air is passed, and a heating and cooling arrangement for regenerating the solvent absorber liquid. A heat exchanger recovering heat from an incinerator or oven exhaust vaporizes the solvent and the solvent is recovered by being passed over cooling coils in a condensing chamber. The exhaust air is treated with a water circulation system to remove paint solids, a proportion of the solvent vapors passing into solution with the treatment water. A solvent stripper is provided consisting of an arrangement for applying a vacuum to the water circulated from a paint solid removal unit, causing the solvent to be vaporized out of solution, with the vapors condensed by being passed over cooling coils in a condensing chamber. The air and water stripper condensing chambers are purged by a vacuum pump directing the uncondensed solvent vapors and non-condensables into the incinerator.

6 Claims, 15 Drawing Figures

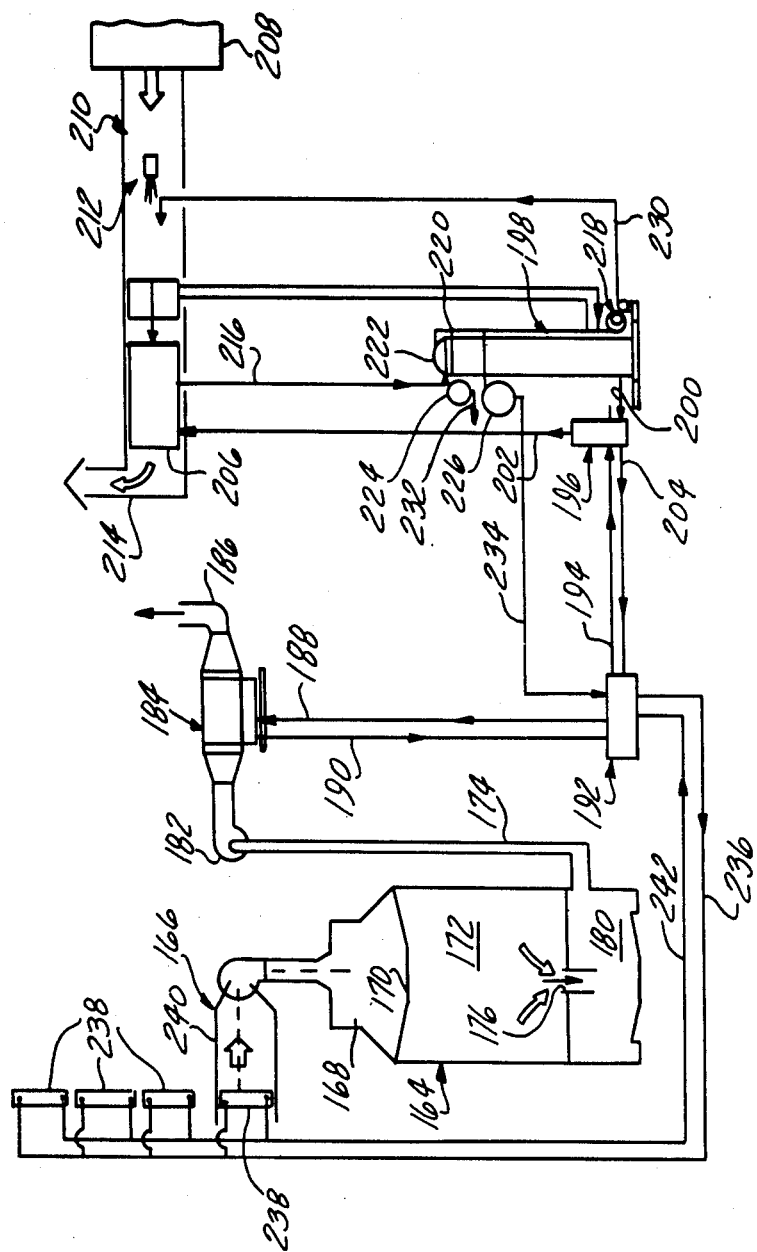

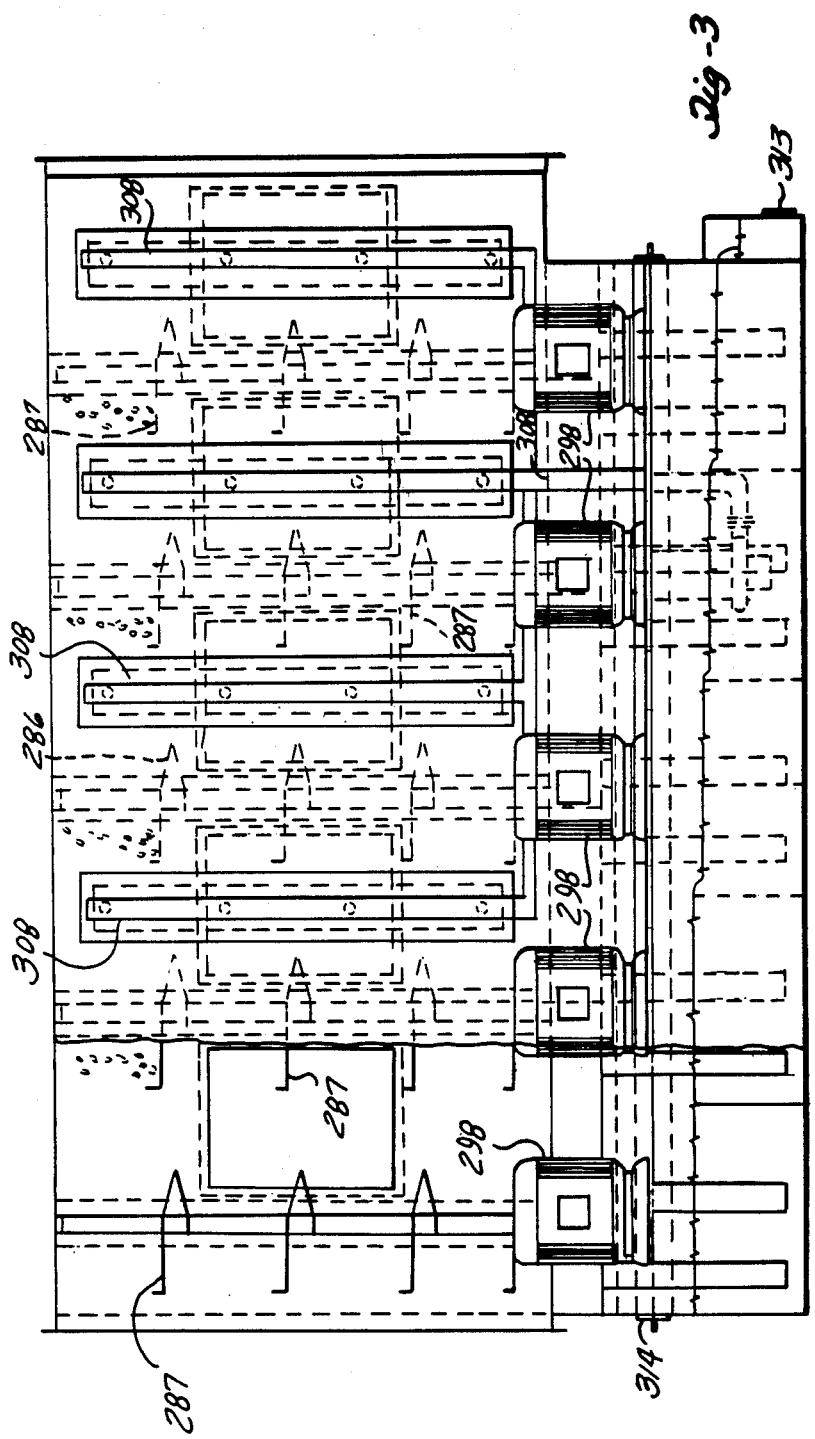

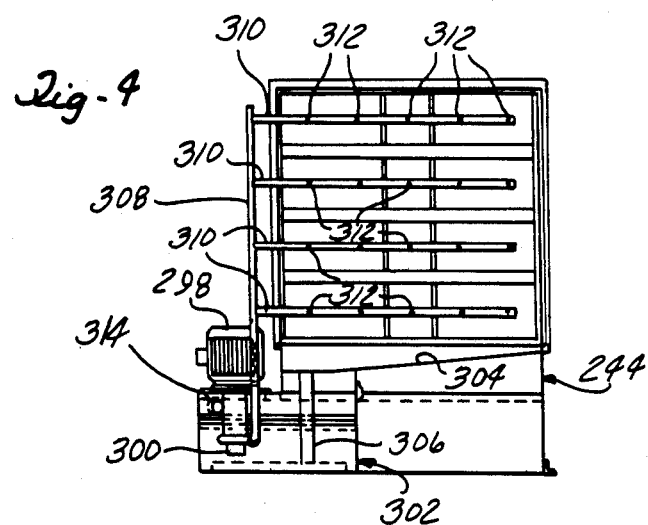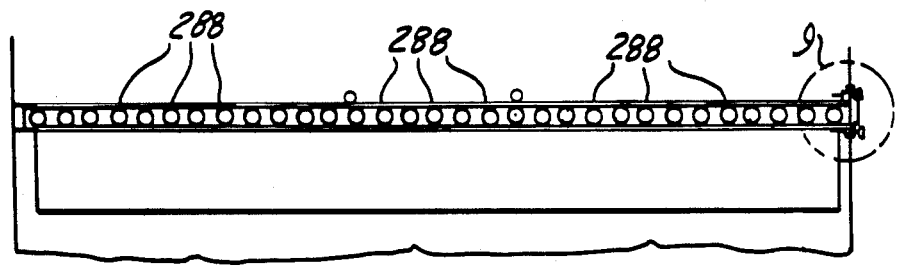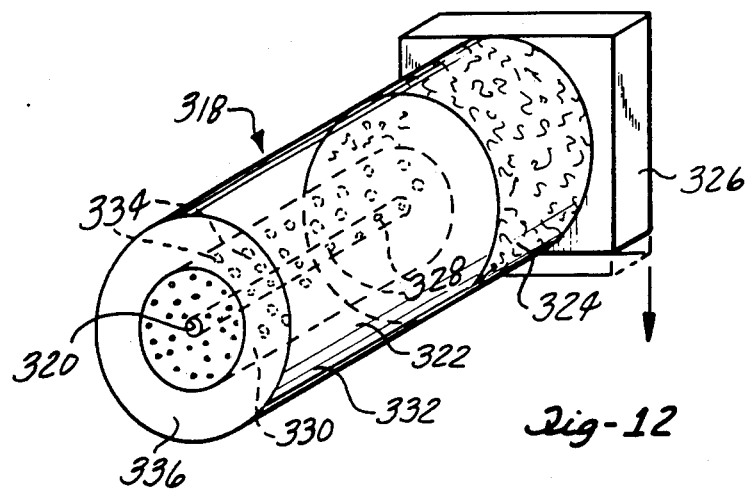

4,620,858

PROCESS AND SYSTEM FOR ELIMINATION OF PAINT SOLVENT VAPORS

This application is a division, of application Ser. No. 524,640 (now abandoned), filed 8/19/83 which is a divisional of Ser. No. 330,744(Now abandoned) which is a continuation-in-part of application Ser. No. 235,270 filed Feb. 17, 1981 (now abandoned), which is a continuation-in-part of application Ser. No. 74,647 filed Sept. 12, 1979 now U.S. Pat. No. 4,261,707.

TECHNICAL FIELD

The present invention generally relates to painting apparatus and processes, and deals more particularly with a system and process for removing and disposing of organic solvent vapors released from painting processes employing organic solvent based paints.

BACKGROUND ART

Recent trends have developed two major factors in the design of industrial facilities, i.e., the increasingly stringent governmental pollution control requirements, and the cost and availability of energy. Particularly difficult problems in this regard are found in the design of paint spray booth facilities for the application of paint to automotive bodies and similar products, due to the enormous volumes of air flow required in the paint spray booths in industry.

The pollution problems are associated primarily with the organic liquid constituents, including solvents, thinners and diluents of paints. Such liquid constituents are vaporized during the paint application, which vapors pass into air circulated through the booth. Such air must be circulated at relatively high volume in order to enable the paint sprayers to work in a safe, healthful and clean environment.

The rigorous standards of emissions applied to industrial facilities precludes the discharge of such organic or solvent vapor laden air directly into the atmosphere, and such vapors in the discharged air are required to be reduced to very low levels.

A common approach in eliminating such vapors which are combustible is to incinerate the same by passing the air inyto an incineration chamber which is heated by a burner to raise the temperature of the air sufficiently to cause oxidation of, for example, the hydrocarbons into carbon dioxide and water vapor prior to being exhausted to the atmosphere.

However, for the enormous air flow rates exhausted from paint spray booths, the incineration process requires vast expenditures of energy, thus rendering this solution very costly to implement.

Another alternate approach which has been attempted and considered in this context is the use of adsorber beds such as of activated charcoal, over which the exhaust air is passed for direct adsorption of the solvent vapors, thus enabling their elimination from the exhaust air.

Again, the enormous air volumes in automotive production and similar applications and the need to regenerate the adsorber beds render this approach extremely expensive.

Yet another approach which has been proposed involves the replacement of the organic solvent based paint with water based paint, the elimination of vapors thus enabling direct discharge of the exhaust air to the atmosphere, after filtration or other treatment of the air to remove the paint solids.

While effective in this regard, the water based paints require close control over the temperature and humidity of the air supplied to the booth, with air cooling and dehumidification during summertime, and heating and humidification during wintertime operation. This psychrometric control requires considerable capital investment and furthermore entails considerable energy to execute.

Certain advances have been made in reducing the solvent content of paints and also in the paint application process to reduce the quantity of organic solvent vapors escaping, but there has not been provided a relatively simple, inexpensive and reliable means for eliminating the organic emissions which does not entail excessive expenditure of energy when eliminating relatively low concentrations of solvents. Such low concentrations are a result of the working conditions in which large volumes of ventilating air are passed into the spray booth. These large volumes of fresh air flow must be warmed during wintertime operation and then exhausted to the atmosphere, representing a large energy loss.

Accordingly, it is an object of the present invention to provide a system and process for the elimination of organic vapors at relatively low concentrations, i.e., a few hundred parts per million, from the air exhausted from a paint spray facility in which the equipment required is relatively inexpensive to install and operate.

It is a further object of the present invention to provide an absorption system which is adapted to accommodate the great volumes of air flow involved in typical automotive paint spraying installations.

A still further object of the invention is to provide a solvent absorption system as described above which may be integrated into a paint spraying operation so as to minimize the energy requirements involved in the absorption process.

DISCLOSURE OF THE INVENTION

These and other objects of the present invention, which will become apparent upon a reading of the following specification and claims, are achieved by a system and process associated with the paint spray booth recovery system wherein the exhaust air is treated by being passed through a water scrubbing system such as to remove the paint solids from the air, and which water partially absorbs the organic vapor.

Solvent stripping is executed both on the water, after the filtration and removal of the paint solids, and also on the exhaust air after it has passed through the water scrubbing system to remove the paint solids. A portion of the exhaust air or the water may be returned to the spray booth either before or after it is stripped of solvent vapors.

The air stripping operation comprises directing the exhaust air through an absorber liquid spray scrubber in which the solvent is absorbed by an absorber liquid sprayed into the exhaust air stream. The scrubber includes a multi-stage absorber unit through which the exhaust air stream containing the solvent vapors is passed. Each stage consists of a vertical array of confined coalescer pad sections of knitted filaments of metal or similar distributed surface over which the absorber liquid, typically an oil, is sprayed. The solvent laden air passes through the successive stages and 80–90% removal of the solvent is achieved so as to reduce the solvent concentration in the air to a level acceptable to be exhausted to the atmosphere.

The absorber liquid is collected by gravity draining from each of the coalescer pad sections, and is circulated to a regeneration system for continuously removing solvent from the absorber liquid and recirculating the same to enable recirculation for respraying onto the coalescer pads.

The regeneration process utilizes heat to drive off the solvents from the absorber liquid. The regenerator system is integrated into the paint spraying and drying operation, thereby substantially reducing energy requirements; the heat employed to vaporize the solvent is derived either from heat generated in a fume incinerator associated with the paint drying ovens or from the exhaust of such ovens.

The organic vapors driven off from the absorber liquid are condensed on cooling coils disposed in a condensing chamber and recovered in a suitable recovery vessel. The remaining uncondensed vapors are drawn out of the condensing chamber into the incinerator.

The removal of the organic compounds in the water is achieved by circulation of the water downstream of the solids removal equipment through a region in which a vacuum is applied to reduce the pressure above the water flow to a point whereat the solvents are vaporized into the region. The vapors are then condensed in a condensing chamber by being passed over cooling coils while the chamber itself is purged of the uncondensed vapors and the collected vapors from the chamber are drawn into the incinerator.

The water is circulated through a double standpipe into the condensing chamber with the elevation of the standpipe enabling the vacuum to be applied to allow free flow of the water through the standpipe.

The double standpipe includes a central pipe disposed within a large diameter outer standpipe, with the water circulating up the annulus between the inner and outer standpipes and thence over and into the open end of the inner standpipe.

A refrigeration unit is employed to produce the necessary cooling liquid flow through the respective cooling coils, and the refrigeration unit also operates to dump the heat extracted during condensation of the vapors into the air exhaust during summertime conditions and to preheat the incoming air during wintertime conditions, thus recovering heat and saving energy.

BRIEF DESCRIPTION OF THE DRAWINGS

In the drawings, which form an integral part of the specification and are to be read in conjunction therewith, and in which like reference numerals are employed to designate identical components:

FIG. 2 is a diagrammatic representation of a paint application facility incorporating a system for eliminating paint solvent vapors from the air only according to an alternate embodiment of the present invention;

FIG. 3 is a longitudinal view of an absorption unit associated with the system depicted in FIG. 2, parts being broken away in section for clarity;

FIG. 4 is a sectional view taken along the line 4—4 in FIG. 5;

FIG. 11 is a plan view of a typical channel support for the coalescer pad; and,

FIG. 12 is a perspective view of an alternate form of an absorber unit which may be employed in the system depicted in FIGS. 1 or 2.

BEST MODE FOR CARRYING OUT THE INVENTION

The system disclosed herein has particular application to the paint spray booth of the type including the use of a water flooded floor beneath the paint spray area in which the paint spray operations are conducted and in which the paint and solvent laden air is drawn down through the floor grills and exits through particulate scrubbing means beneath the grilled floor of the spray booth working area.

The air and water passing with great turbulence and intimate contact through the tubes causes the solids in the paint, i.e., the pigments, resin and other components, to be removed from the air and become suspended within the water flow. Such an arrangement is disclosed in U.S. Pat. No. 3,421,293 to Halls.

In order to remove the paint solids from the circulated treatment water, arrangements have been provided for collecting the paint solids and removing them from the water flow, as by causing them to raft on the surface of a collecting tank. Such an arrangement is disclosed in U.S. Pat. No. 4,100,066 to Bloomer et al.

The particular composition in paint used in automotive production and similar processes varies with the particular requirements and with the particular manufacturer of the paint. However, a number of organic liquids are usually included, as solvents, thinners and diluents, some of which are typically soluble in water and others of which are not.

Accordingly, in passing with the water in intimate contact therewith, the air exhausted from the spray booth tends to cause a proportion of the solvent vapors contained in the exhaust air to go into solution with the circulated treatment water. The remaining hydrophobic vapors passed out with the exhaust air.

Thus, if the composition of the paint is such that a significant proportion of the liquid constituents are water soluble, such water flow treatment utilized in the spray booth air exhaust system itself represents means for partially eliminating the organic vapors.

On the other hand, the recirculated water cannot continue indefinitely to pick up the organic compounds and soon becomes saturated with them, and some means must be provided for their continuous removal from the circulated water.

In the past, such elimination has been difficult due to the presence of the paint solids. In addition, due to the high specific heat of water and the large volumes required, the conventional process of heating the water to drive off the vapors is rendered economically impractical, as a result of the enormous heat energy which would be required.

The system and process according to the present invention is thus contemplated as advantageous for use in paint spray booths of the type having a water flow treatment of the air exhausted, with equipment of the general type described in the aforementioned Bloomer et al patent for removal of the paint solids, and for use with paint compositions having a significant proportion of the water soluble organic solvents.

Figure 1:
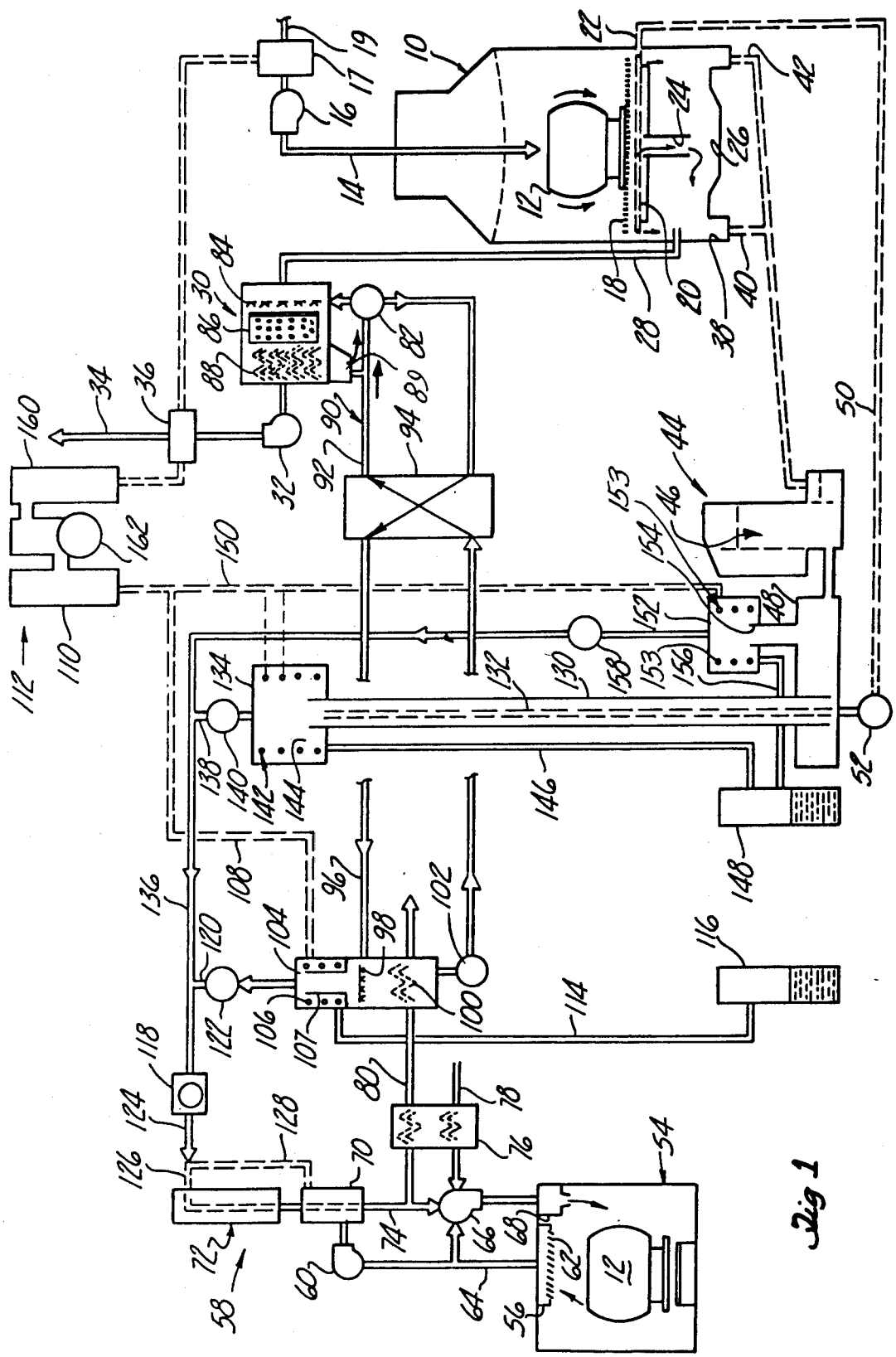
FIG. 1 is a diagrammatic representation of a paint application facility including a system for eliminating paint solvent vapors from both air and water according to the preferred embodiment of the present invention.
Figure 5:
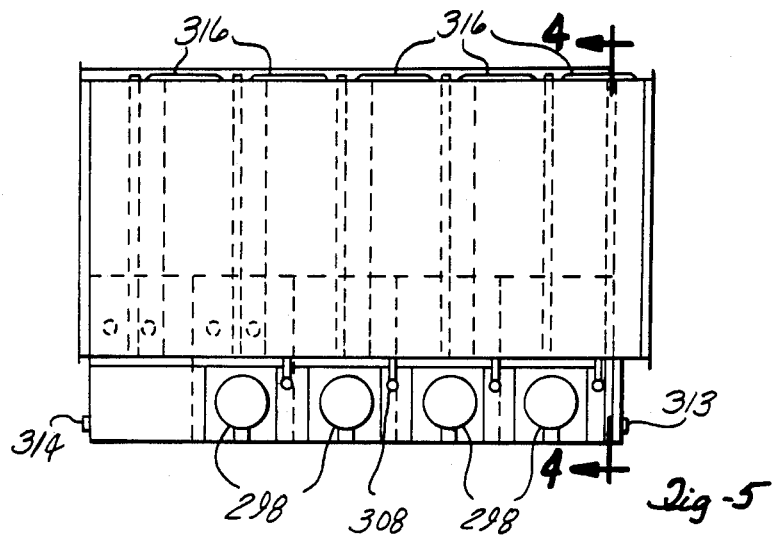
FIG. 5 is a plan view of the regenerator unit shown in FIGS. 3 and 4.
Figure 7:
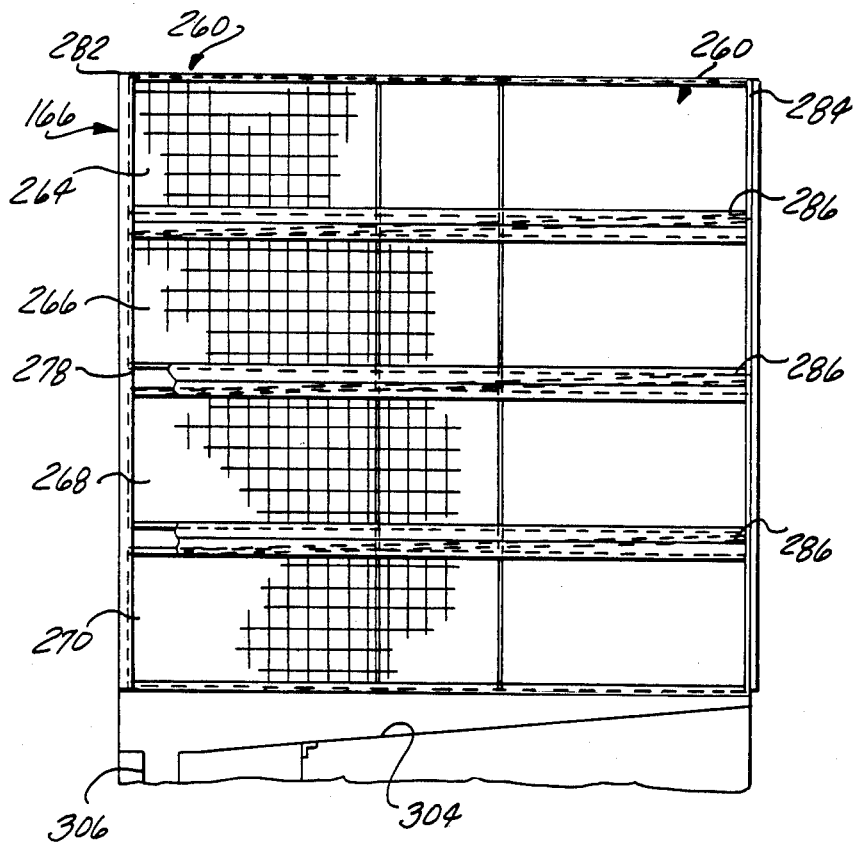
FIG. 7 is an air entry view of a typical coalescer pad stage.
Figure 6B:
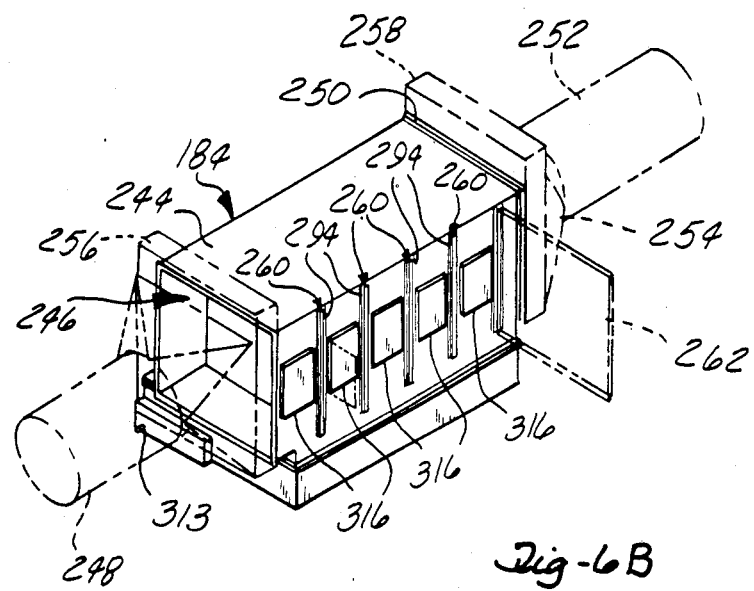
FIG. 6B is a reverse perspective view of the absorption unit shown in FIG. 6A with a phantom representation of a coalescer pad withdrawal.
Figure 6A:
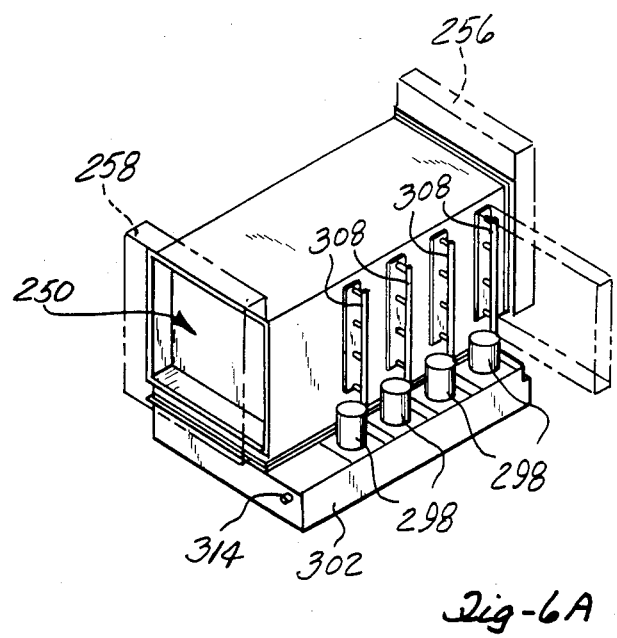
FIG. 6A is a perspective view together with a phantom representation of a spray header withdrawal from the absorption unit depicted in FIGS. 2-5.
Figure 8:
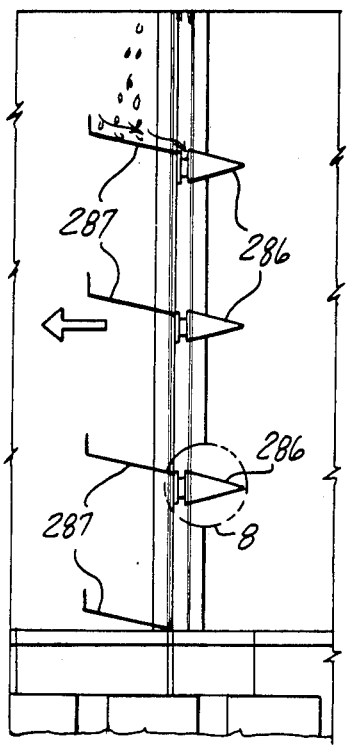
FIG. 8 is a side view of a typical coalescer and associated drain structure.
Figure 9:
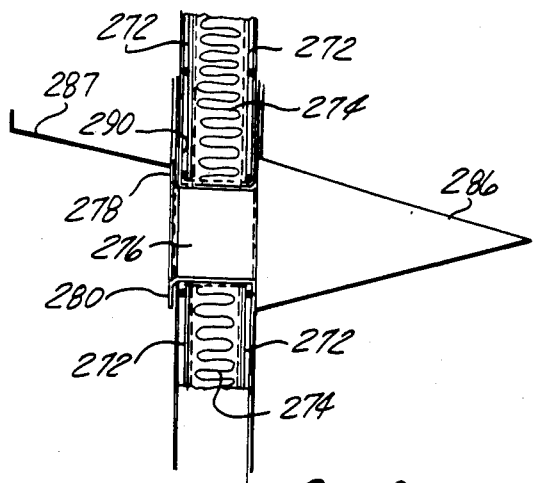
FIG. 9 is an enlarged detailed view depicting the area 8 of FIG. 8.
Figure 10:
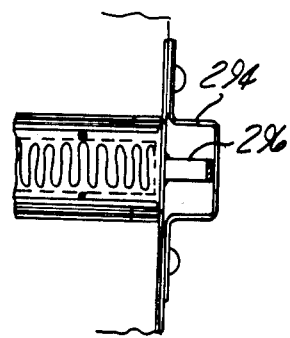
FIG. 10 is an enlarged detailed view depicting the area 9 of FIG. 11.

Referring first to FIG. 1, one embodiment of the invention is adapted for use with a paint spray booth 10, comprising an enclosure within which an auto body shell 12 or other component is painted during production. The air supplied for ventilation is received via ducting 14 and caused to be circulated by means of a supply blower 16.

A wintertime heat exchanger 17 is provided, for purposes to be described, and the inlet duct 19 receives fresh air from the building exterior. The air passes through a grill 18 disposed across the floor of the paint spray booth 10 and thence over a flooded subfloor 20 which receives water flow via supply line 22. The water over the subfloor 22 tends to partially collect the overspray during paint spraying operations, which settles into the water. The air with the balance of overspray, partially fine particles and solvent vapors, is circulated out through longitudinally spaced outlet tubes 24 through which the water from the floor 20 flows. An intense scrubbing action of the air occurs in the tubes and the paint is transferred to the water which flows into a collecting pan 26.

The exhausted air, after passing through the outlet tubes 24 and having the paint solids thereby substantially removed, passes out through an exhaust duct indicated at 28 and thence passes through an exhaust air organic vapor absorber unit or stripper 30, which will be described hereinafter in further detail, and thence directed to the exhaust by an exhaust blower 32 to an outside stack 34. A heat exchanger 36 is also provided, for purposes to be described.

The water entraining the paint solids and having a proportion of solvents dissolved therein passes into collecting flumes 38 from which it is withdrawn through lines 40 and 42 to be directed to a paint solid removing apparatus 44. This design is contemplated to be of the type described in the aforementioned Bloomer et al patent and consists of a first collecting chamber 46 which receives the paint solid containing water and causes collecting of the paint solids which are periodically removed.

A level control tank 48 is also provided which causes the water to be regulated in the interior of the removing apparatus 44 in order to maintain the appropriate levels to conduct the removal process.

The return line 50 recirculates the water via pump 52 onto the spray booth subfloor to enable continuous execution of the process. Thus, the air exhausted through the exhaust duct 28 is substantially free from paint solids but does contain those organic solvent vapors which have not gone into solution with the water.

Similarly, the water in level control tank 48, while having the solids substantially removed therefrom, still contains the solvents in solution. The solvent must be continuously removed if the water is not to become saturated.

Also integrated into the system and process according to the present invention is a diagrammatic representation of a paint curing oven 54 in which air is heated and passed to maintain the temperature at a suitable high level for proper paint drying and curing. The air is withdrawn into a ceiling duct 56 and thence in part circulated through a fume incinerator 58.

This arrangement has been employed and includes an exhaust blower 60 which draws air upward through louvers 62 and thence through the ceiling duct 56 and through exhaust duct 64.

A proportion of the exhaust flow is recirculated by a supply fan 66 and a plenum 68 into the interior of paint curing oven 54. A portion of the exhaust flow is drawn off by the exhaust blower 60, and passed through an air-to-air heat exchanger 70 which preheats the air by incinerated air exiting from an incinerator chamber 72. The preheated air enters the inlet 126 of the incinerator chamber 72 via duct 128. After passing through the incinerator chamber 72, a portion of the incinerated air is received by the inlet of supply fan 66 through duct 74.

The incinerator design is of a type as shown in U.S. Pat. No. 3,917,444 to Carthew.

A second air-to-air heat exchanger 76 provides an exchange of heat between fresh, make up air introduced through ducting 78 and the remaining incinerated air flow vented to the atmosphere through vent 80.

The process according to the present invention envisions the removal of solvent from the exhausted air after passing into the exhaust duct 28 and also the removal of the solvents from the water after solids removal in apparatus 44 and entry into the level control tank 48. As mentined previously, the elimination of vapors from the air is achieved in an absorption type air stripper 30 indicated in which absorbing liquid is circulated via pump 82 through a bank of spray nozzles 84. The liquid may comprise an oil or oil base derivative or any other substance having an affinity for organic solvents.

The air passes through a matrix 86 which is sprayed with a liquid absorbent. The matrix 86 initially facilitates the development of a very large liquid absorbing surface to which the organic solvent vapors are attracted. Thus, the substance having an affinity for organic vapors is made to exhibit a relatively large surface area to volume ratio. Subsequently, it causes the now-solvent laden liquid to coalesce into larger droplets which may be separated from the air stream by gravity or as hereafter described.

After passing through the coalescing matrix 86, a series of baffles 88 cause the now-larger sized absorber liquid droplets to be eliminated from the air stream, collected in a collecting compartment 89 to enable the liquid to be directed to the return side of the circulation pump 82. The air thence is directed to a vent by exhaust blower 32 as indicated previously. Another absorbing unit will be described later.

Since a given quantity of absorbing liquid cannot absorb the solvent vapors indefinitely, a regeneration arrangement is provided in which a portion of the absorbing liquid is circulated through a regeneration loop 90 which includes an inlet line 92 receiving the solvent laden absorbing liquid which passes through a liquid-to-liquid heat exchanger 94. This causes the liquid to be preheated by returning absorbing liquid which is heated in the regeneration process previously described.

In the regeneration process, the heat required to drive off the solvent in the absorbing liquid is modest since the volume and specific heat of absorbing liquid is relatively low compared to other absorbing media.

To further maximize the efficiency of the process over that gained by the use of the liquid-to-liquid heat exchanger 94, the regeneration process is integrated with the fume incinerator, which is associated with the paint curing oven 54.

The solvent laden absorbing liquid is passed through regeneration supply line 96 and is sprayed through a series of nozzle 98 over high temperature heating coils 100 which heating coils receive the incinerated air vented via vent 80, after leaving the incinerator chamber 72 after being passed through the air-to-air heat exchangers 70 and 76. Thus, the heat of the incinerator is partially recovered to be utilized for regeneration heat. A recirculating pump 102 causes recirculation of the regenerated absorbing liquid back to the supply side of the pump 82 via line 90.

The absorbing liquid heated and purged of solvents by contact with the hot surface of the heating coil 100 releases the vapors to be condensed in condensing chamber 104 by contact with the cooling coil 106 disposed in a collection compartment 107 and receiving a flow of chilled liquid via lines 108 circulated around the expansion side 110 of a mechanical refrigeration unit generally indicated at 112. Collection compartment 107 is provided with a drain line 114 communicating with a recovery tank 116.

Condensing chamber 104 is maintained at a relatively low pressure to maximize vaporization of solvents out of the absorbing liquid. The condensing chamber 104 is preferably put under a partial vacuum by means of a vacuum pump 118 having an inlet line 120 including a pressure motivated valve 122, which regulates the pressure sustained in condensing chamber 104.

The outlet 124 communicates with the inlet 126 of the incinerator chamber 72 such that the organic vapors pass into the incinerator chamber 72 and are incinerated with the vapor carrying air received from the outlet side of the air-to-air heat exchanger 70.

Accordingly, it can be seen that a high efficiency removal of the organic vapors from the spray booth exhaust air is achieved by this arrangement. Firstly due to the passing into solution of a substantial portion of the vapors into the water from whence it is removed by vacuum distillation. Secondly by the absorbing liquid spray which is suited to handle relatively large volumes of air with relatively modest quantities of absorbing liquid, which liquid is comparatively easily regenerated in order to provide a steady state process even for the enormous volumes of air flow usual in these installations.

The regenerator arrangement itself is highly efficient utilizing the liquid-to-liquid heat exchanger 94 and the use of otherwise waste heat generated by the fume incinerator 58. By comparison to prior art approaches, the capital investment required is quite modest, as are the energy requirements in carrying out the process.

Referring to the solvent water scrubber portion of the sysatem and process, in which the solvent is removed from the circulated water, the system uses the application of a vacuum above the water as it circulates such as to cause the direct vaporization of the organic compounds. The water is elevated approximately 30 feet to the condensing chamber to enable a low vapor pressure to be maintained in the chamber. The chamber is continuously purged to remove non-condensable gases such as air and the relatively low pressure facilitates the vaporization of the solvents and thus removal from the circulated water without heating of the water mass itself.

It can be shown that the vaporizaion rate produced by the pressure reduction is at a level corresponding to that achieved at a considerably elevated temperature which would be necessary if the space above the solvent laden water was at normal atmospheric pressure.

The particular arrangement for achieving the pressure reduction over the top of the water includes an outer standpipe 130 of relatively large diameter, the lower end of which extends into level control tank 48. Within the interior of the large diameter outer standpipe 130 is a relatively smaller diameter inner standpipe 132 with a clearance space therebetween enabling the water to flow up the outer standpipe 130 and down the inner standpipe 132.

The large diameter outer standpipe 130 is of greater height than the inner standpipe 132 as indicated, such that the water is contained therein as it passes into the interior of the inner standpipe 132 while flowing exposed to the interior of the condensing chamber 134.

The condensing chamber 134 is evacuated by the connection via line 136 across the branch connection 138 and pressure regulation valve 140 to maintain a low total pressure somewhat less than the vapor pressure of the water flowing through the standpipes 130 and 132.

The height of the standpipes 130 and 132 is selected to relate to the vacuum interposed on the condensing chamber 134, i.e, full vacuum of the corresponding pressure head would be approximately 33 feet of water such that the water will be subjected to the low vacuum without causing it to be drawn into the interior of the condensing chamber 134.

This relatively low pressure in condensing chamber 134 produces a greatly enhanced tendency for the dissolved organics to vaporize, while the water, having much less tendency to vaporize, will flush off in the condensing chamber 134 to a much lesser extent so as to be present in relatively inconsequential quantities. The organic vapors are condensed by cooling coils 142 supplied with cooled heat transfer medium flowing via line 150 and which are disposed in the condensing chamber 134 to cause the vapor to be condensed into liquid form and collected in the compartment 144.

The collected liquid passes into drain line 146 and to a recovery vessel 148.

The continuous purging of the interior of the condensing chamber 134 via line 136 insures the removal of non-condensable gases and the maintenance of the relatively low pressure at which the organic solvents freely evaporate out of the water.

The liquid level control tank 48 may also have a slight vacuum applied to the region above the water level by a condensing chamber 152 provided with a vent tube 154 supplied with a connection drain line 156 to the recovery tank 148 and a branch line to the vacuum pump 118. A cooling coil 153 is provided in the condensing chamber 152 and is supplied with a flow of cooled heat transfer medium via line 150.

A relatively slight vacuum is applied to enable the free flow of water into and out of the level control tank 48 while collecting the solvent vapors which may accumulate above the water level in condensing chamber 152. The vacuum is set by the pressure control valve 158.

In order to maximize the efficiency of the use of refrigeration unit 112, the heat exchanger 36 receives a flow of a heat transfer medium circulated through the condenser tubes in condenser 160 in order to dissipate the heat transferred by operation of the compressor 162 from the evaporator 110. The heat to the evaporator originates from the heat of condensation of the solvent vapors in the respective condensing chambers 104, 134 and 152. The heat exchanger 36 rejects the heat into the exhaust air which is relatively cool during summer conditions.

During winter conditions, the heat is transferred via the heat exchanger unit 17 to prewarm the incoming air and thus enhancing the efficiency of the process to this extent.

Attention is now directed to FIG. 2, wherein an alternate form of the invention is depicted which is similar in many respects to that previously described. The alternate form of the invention is adapted for use with a paint spray booth 164 of the type utilized in conducting paint spray finishing of automotive truck and car bodies, which features an air supply system generally indicated at 166 that causes conditioned air to be entered into an upper plenum space 168 through a diffuser ceiling layer 170, before passing into the working area 172 of the booth.

The air is exhausted through an exhaust ducting 174 after passing through a paint solids removal system which preferably takes the form of a water washed series of tubes similar to that previously described with reference to FIG. 1.

In this system, a series of exit tubes 176 pass out through the bottom of the floor 178 which is adapted to be flooded with water and a weir overflow causing an outflow of water through the exit tubes 176. Flow through the exit tubes 176 causes a thorough washing of the extract air passing out through a below-floor space 180 in communication with the exhaust ducting 174.

Accordingly, the exhaust ducting 174 receives air which has been substantially completely freed of overspray paint solids but which contains a solvent vapor typically at 220 to 400 parts per million. While this constitutes a relatively dillute proportion of solvent vapors, the concentration is still too high to simply be discharged to the atmosphere without potentially running afoul of pollution control standards.

An air exhaust fan 182 directs the exhaust flow through a multi-stage absorber unit 184 whereat the solvent vapors are absorbed prior to the air being passed through an exhaust stack 186. such absorber unit 184 is typically of a special design as will be described hereinafter and essentially provides a contact of the air exhaust flow with a flowing film of solvent absorber liquid such as oil over which the air passes. The liquid according to the concept of the present invention is caused to be regenerated such that there is an inflow of relatively solvent free liquid received over a supply line 188 and a collection of solvent laden liquid over return line 190.

The supply and return lines 188 and 190, respectively, are in communication with the installation tank, pump and filter means generally indicated at 192, including a collection tank, liquid circulating pumps and filtration units; the latter remove the minor quantities of paint solids which may accumulate in the liquid which result from the small quantity of paint solids still present after the water scrubbing operation in the paint spray booth 164.

After such filtration, the solvent laden liquid is circulated via line 194 to a heat exchanger 196. The heat exchanger 196 comprises a preheating means for the liquid contained in line 194 by a heat exchange relationship with the relatively hot liquid returning from the distillation column 198 in line 200, such that the relatively hot solvent free liquid causes an elevation in the temperature of the solvent laden liquid in line 200. The returning liquid, even after passing through the heat exchanger 196 while at a relatively reduced temperature in line 204 is still at an elevated temperature, i.e., on the order of 280° F.

The preheated liquid in line 202 is circulated through an incinerator heat exchanger 206. The heat exchanger 206 is associated with exhaust paint drying oven 208 in which solvent laden air is exhausted through ducting 210 and passes through an incinerator section generally indicated at 212. The solvent vapors are incinerated such that a relatively hot solvent free exhaust gas may be exhausted through an exhaust stack indicated at 214. Such incinerator system may be similar to that previously described with reference to FIG. 1.

This represents a clean source of heat which is employed according to the concept of the present invention to further heat the already preheated liquid flow in line 202 to a temperature at which distillation regeneration process may be conducted.

Accordingly, liquid in line 216 after passing through the second heat exchanger 206 is heated to a relatively elevated temperature level, i.e., typically on the order of 480° F.

The heated solvent laden liquid in line 216 enters a distillation column 198 at the upper reaches thereof and passes downwardly through trays disposed therein while giving up the solvent content by vaporization of the solvent content.

Such distillation column 198 may be of conventional known construction per se, as employed in various distillation processes in the oil refining industries.

Preferably, the operation of the distillation column 198 is under a partial vacuum, i.e., 26 inches of mercury vacuum, in order to enable distillation to proceed at relatively modest temperatures, i.e., such as the aforementioned 480° F.

For this purpose, a vacuum pump 218 is employed having inlet line 220 applied to the lowest pressure area of the distillation column 198. The vacuum pump 218 also withdraws vapors from solvent condenser 224 and a condenser 226 such that the exhaust in vacuum pump 218 contains solvent and liquid vapors which are routed into the incinerator section 212 through line 230 to burn these vapors to allow exhaust into the atmosphere of the outflow from the vacuum pump 218.

The solvent vapors formed in the interior of the distillation column 198 are withdrawn to be collected in the solvent condenser 224 and with a collector line 232 leading to a solvent location facility. Any absorber liquid vapors which are formed are collected in the condenser 226, being withdrawn at a lower elevation in the distillation column 198.

Any condensed absorbent liquid vapors are returned via line 234 to the installation tank, pump and filter means 192 for recirculation to the absorber unit 184.

The hot solvent free unvaporized liquid removed from the lower section of the distillation column 198 in line 200 is passed through the heat exchanger 196 where it is colled to 280° F. mentioned above.

In order to recover the heat energy in the 280° F. liquid in return line 204, the liquid is circulated through a line 236 to a heat recovery means comprised of a series of air-to-liquid heat exchangers 238 as shown. The heat energy is thus utilized in the air supply system 166 in which the incoming air and ducting 240 are heated by passing through the air-to-liquid heat exchanger 238. A series of such heat exchangers may be employed each for a different spray booth section.

Alternatively, the heat exchangers may be employed for supplying the heat for other low grade heat using processes, such as to heating of the water and phosphate solution in the pretreatment plant to the relatively modest temperatures required, i.e., 160° F.

Thus, the liquid is cooled in the return line 242 to the installation tank, pump and filter means 192 which then circulates the now cool, i.e., 65° F., solvent free liquid to the supply line 188 and thus enables continuous regeneration of the liquid to remove the solvent picked up in the booth exhaust air.

It can be appreciated that, in effect, the absorption process is carried out without the utilization of significant heat energy notwithstanding the utilization of a heat distillation process for regeneration. The concept may be viewed as a unique inclusion of the absorption system in the heat recovery system in which the heat energy recovered from the oven is utilized to precondition the supply air otherwise recovered. The absorption system is incorporated in this loop such as to not remove any net energy other than the negligible amount required for circulation of the liquids, pump, etc. At the same time, the system is relatively simple, reliable and trouble free as compared to other regeneration systems.

Also, the absorption unit itself is relatively lightweight and compact compared with other prior art structures such as to enable a great degree of flexibility in the installation of such units.

Referring to the drawing FIGS. 3-11, the constructional details of the absorber unit 184 itself are disclosed.

This includes a sheet metal housing 244 having an inlet opening 246 at one end receiving the ducting 248 connected to the exhaust from the air exhaust fan 182. Outlet openings 250 are connected to the cross ducting vent stack 252 with a plenum transition 254.

Suitable fire doors 256 and 258 are provided for closing off the absorber unit with a fusible link mechanism (not shown) enabling a closing off of the absorber unit in a manner known in the art.

The absorber unit 184 is of a multi-stage construction and it has been found that successive independent stages of air-to-liquid contact provide the very effective control or reduction of the solvent vapor content of the air such as to enable relatively complete solvent removal, i.e., 80% solvent content removed after passing therethrough.

Each stage consists of a coalescer pad assembly 260 which is sprayed with an absorber liquid such as oil. The assembly 260 provides a coalescer matrix for causing the droplets from the spray of absorber liquid to coalesce. The final coalescer pad assembly 262 is provided at the exit end to remove any liquid droplets contained in the exhausting air. Each of the coalescer pad assemblies 260 and 262 consists of an array of pad sections 264, 266, 268 and 270 disposed extending transversely across the interior of the sheet metal housing 244 so as to cause the entire flow to be intercepted in passing through the coalescer pad sections.

Each of the coalescer pad sections 264, 266, 268 and 270 includes an outer mesh 272 on either side of the pad 274 of knitted filament material, which may be either metal or plastic. This material is of the type commercially available and is kown as type H or equivalent, manufactured by Begg, Cousland & Co., Ltd. of the United Kingdom and is of a similar material to that employed in scouring pads.

Each of the coalescer pad sections 264, 266, 268 and 270 is disposed in a surrounding channel frame indicated at 276 consisting of bottom and top channels 278 and 280, and side channels 282 and 284 welded together to form the framework. The bottom and top channels 278 and 280 are joined with a deflector section 286 forming a V-shape transition into the coalescer pad sections such as to deflect the air flow smoothly into the coalescer pad sections. A drain tray 287 is disposed at the bottom of each pad section 264–270, on the air exit side thereof which captures absorbing fluid droplets that are drawn through the pad section and pass downwardly by gravity.

The bottom and top channels 278 and 280 are perforated as may be seen in FIG. 11 and perforated with holes 288 in order to enable drainage of the liquid from each of the coalescer pad sections 264, 266, 268 and 270.

The coalescer pads are retained at their outer edges with a suitable channel frame indicated at 290, the bottom of which is also perforated for this same purpose.

Each of the coalescer pads is fitted with an endcap 294 to which is bolted a suitable handle 296 provided to the outer channel frame 290.

As noted, each of the coalescer pad assemblies 260 is adapted to be sprayed with an absorber liquid such as oil in order to provide the saturation of the pad and enable the pad to be thoroughly wet with the absorber liquid to thus provide an intimate contact with the air flow through each of the pads.

A suitable arrangement is provided by a circulation pump 298 receiving inlet supply tube 300 positioned in a sump pan 302 positioned to be adapted to receive all of the drainage from each of the coalescer pad assemblies 260 via a collector pan 306 and a series of down tubes 306. The inclination of the sump pan 306 is such as to provide a self-scouring action to preclude accumulation of solids.

The output of the circulation pump 298 is connected with a header pipe 308 in turn in communication with a series of spray nozzle pipes 310 entering each of the housing stages immediately upstream of a respective coalescer pad having a plurality of nozzle openings 312 adapted to direct a spray of absorber liquid at each of the coalescer pad sections 264, 266, 268 and 270 to thoroughly wet these surfaces.

The collecting solvent laden liquid in the sump pan 302 is connected to the supply and return lines via openings 313 and 314, respectively, for continuous removal of the solvent content.

A series of access doors 316 are also provided which enable entry for cleanout and other maintenance purposes to each of the stages.

It has been found that this multi-stage approach operates efficiently to remove the solvent vapors to appropriate low levels in a relatively lightweight, simple and inexpensive construction, is highly reliable in operation and accordingly it is very well suited to automotive paint spraying installation applications.

Attention is now directed to FIG. 12 wherein an alternate form of the absorber unit is depicted which may be advantageously employed with either of the systems shown in FIGS. 1 or 2. The alternate form of the absorber unit, generally indicated by the numeral 318, broadly includes spray means 320, baffle means, 322, coalescing means 324 and eliminator means 326. The spray means 320 preferably comprises a distribution tube connected to a source of absorber liquid and having a plurality of longitudinally spaced apertures 328 therein, preferably helically disposed about the longitudinal axis of the spray means 320.

Baffle means 322 comprises an inner cylindrically-shaped wall 330 having a plurality of perforations 334 therein and is radially spaced from the spray means 320. Baffle means 322 further comprises an outer cylindrically-shaped wall 332 radially spaced from the inner wall 330 to define a longitudinally extending annular chamber 336 which is open at the outer end thereof.

Coalescing means 324 comprises a pervious pad of material, preferably formed of metal, disposed at the other end of baffle means 332 and in communication with the chamber 336. Coalescing means 324 is adapted to allow the passage of gas therethrough, but contacts and thereby coalesces finely atomized droplets of fluid suspended in such gas. The eliminator means 326 is of a construction well known in the art and is disposed at the downstream end of coalescing means 324.

In operation, the absorber unit 318 is positioned in the corresponding air stripper such that the chamber 336 is disposed toward the oncoming air flow. Solvent absorbing liquid discharged from the spray means discharge tube 320 emanates radially from the tube at relatively high velocity, and perpendicular to the air flow. The absorbing liquid entering the volume of space between the tube 320 and inner wall 330 becomes partially atomized in the air flow. Due to the high velocity and positioning of the jets of absorbing liquid, the central core of the air flow inside inner wall 330 is directed to impinge on the surface of the inner wall 330 adjacent the tube 320. The partially atomized mixture of fluid and air spreads upon impact over the surface of the inner wall 330 and eventually enters the perforations 334. Air entering the chamber 336 and flowing over the perforations 334 acts to shear the atomized mixture of fluid and air passing radially outward through the perforations 334 thereby increasing the atomizing and mixing effect. The finely atomized mixture of fluid and air enters the coalescing means 324 which coverts the mixture into larger droplets which then are drawn by the air flow into the eliminator means 326. Eliminator means 326 collects these larger droplets of the mixture and draws the collected, solvent laden liquid away from the absorber unit 318, as by gravity. It is to be noted that the particular dimensions of the various components of the absorber unit, e.g., the radius of the inner wall 330 and outer wall 332, will be governed by the particular application and type of absorbing liquid employed. It is also to be noted that both the baffle means 322 and coalescing means 324 may be rectangular in cross section if desired. Moreover, although a single baffle is depicted in the drawings, a plurality of concentrically disposed baffles may be employed if desired.

Figure 13:
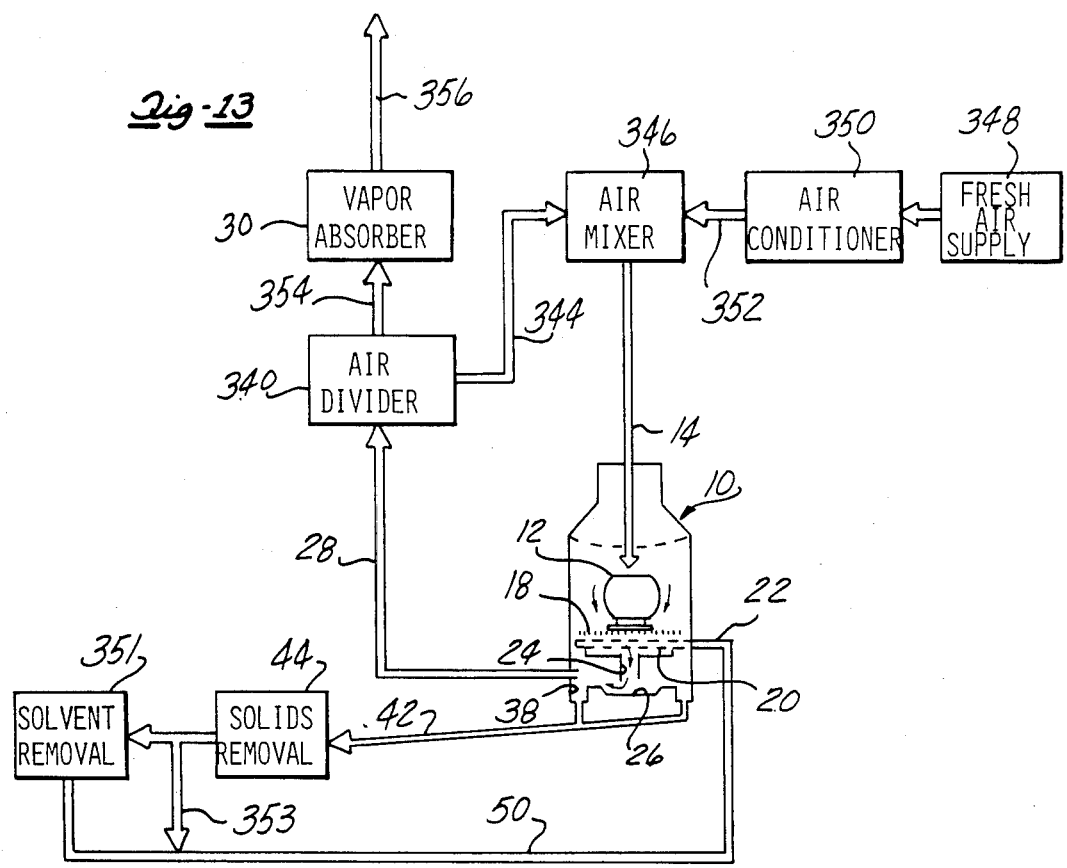
FIGS. 13 and 14 are diagrammatic views of alternate forms of the paint application facilities shown in FIGS. 1 and 2.

With the present trend toward automated paint application, it is apparent that somewhat higher levels of organic vapor in paint application booths can be tolerated compared to hand application by humans which is governed by rigid environmental regulations. The overall costs of organic vapor removal may be substantially reduced where higher levels of the vapor can be tolerated by employing another alternate form of the novel paint application facility which is depicted in FIG. 13. The exhaust air exiting from the spray booth 10 in exhaust duct 28 is delivered to an air divider 340 which diverts one portion of the exhaust air via duct 354 to the vapor absorber 30 (previously described in detail) and the remaining portion to an air mixer 346. The vapor-free exhaust air issuing from the vapor absorber 30 may be delivered by duct 356 through a heat exchanger as previously discussed and then exhausted or used in other processes. Divider 340 and mixer 346 may comprise conventional variable valve-type chambers to permit selection of the proportions of air to be mixed or divided.

Make-up fresh air from a supply 348 is passed through an air conditioner 350 and is delivered via duct 352 to the mixer 346 where it is combined with the exhaust air from booth 10. The outflow from mixer 346 is coupled with inlet duct 14; it may thus be appreciated that a portion of the exhaust air from the booth 10 having organic vapor therein is mixed with fresh make-up air and is returned for use in the booth 10. Since less than the entire volume of exhaust air is being stripped of organic vapor, it is apparent that an absorber 30 of somewhat smaller capacity may be employed thereby reducing both capital operating costs of the vapor removal process. Moreover, the operating efficiency of the vapor absorber 30 is notably increased by virtue of the higher concentration of organic vapor in the exhaust air.

Figure 14:
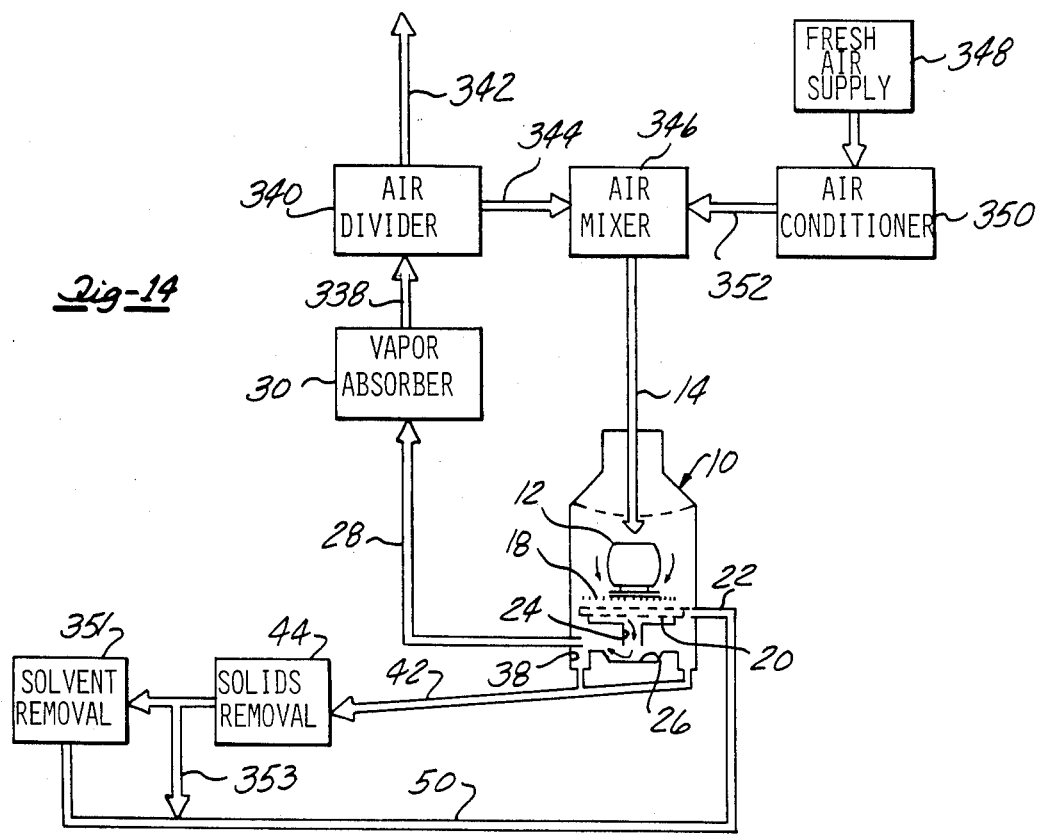

The overall recirculation concept described immediately above may also be applied to the removal of solvents in the solvent water scrubber portion of the system. For example, as shown in FIGS. 13 and 14, after removal of paint solids in the removing apparatus 44, portions of the solvent laden water are directed to the solvent removal apparatus generally indicated at 351 (previously described in detail) and to the return line 50 via line 353. Again, this arrangement reduces capital and operating costs since only a portion of the water exiting booth 10 need be processed for solvent removal, and the portion which is so processed contains a higher concentration of solvents compared to the system disclosed in FIGS. 1 and 2 wherein the entire volume of water is processed by the removal apparatus 351.

Still another form of the invention is shown in FIG. 14 which is broadly similar to that shown in FIG. 13 wherein a portion of the air exhausted from the spray booth 10 is recirculated back to the booth 10. The entire volume of exhaust air delivered via conduit 28 is processed by the vapor absorber 30 and is then routed to air divider 340 by conduit 338. A portion of vapor free exhaust air is delivered to an exhaust by conduit 342, the remaining portion being routed by conduit 344 to an air mixer 346 where it is combined with fresh make-up as previously described. Thus, the entire volume of air supplied to the booth 10 by inlet duct 14 is substantially vapor free.

From the foregoing, it can be seen that a relatively efficient elimination of the organic vapors from the air developed as a result of the paint spraying operation is achieved by a simple arrangement for removing these compounds both from the air and from the paint solid collecting water circulation flow and which accommodates the high volume of air flow without excessively high energy consumption in so doing.

The operation components thereof operate in a highly reliable manner as well as optimizing the utilization of such energy requirement as is needed in execution of the process. While the system is shown having particular applicaton to particular componentry associated with the paint spraying and drying operations specifically, it is of course understood that the inventive concept could be applied to other systems.

We claim:

1. An air handling system for a paint applying enclosure wherein organic solvent base paint application processes are conducted, said air handling system comprising:
   air inlet supply means for introducing a flow of fresh air into said enclosure;
   air exhaust means for causing an exhaust air flow from said enclosure, said exhaust means including paint solid removal means for removing paint solids from said exhaust air flow to provide filtered exhaust air;
   solvent vapor removal means for removing organic solvents from said filtered exhaust air, including a chamber for receipt of the filtered exhaust air, a source of an organic solvent absorbing liquid having an affinity for said organic solvents, means for supplying said organic solvent absorber liquid to said chamber and means for producing contact between said organic solvent absorbing liquid and the filtered exhaust air to absorb the organic solvents in said air;
   regenerator means coupled with said solvent removal means for removing absorbed organics from said absorber liquid to regenerate said absorber liquid, including means for heating said absorber liquid to vaporize the absorbed organic solvents; and
   means coupled with said regenerator means for recirculating regenerated absorber liquid to said solvent removal means.

2. The air handling system of claim 1, including means coupling said vapor removal means with said air inlet supply means for returning at least a portion of the filtered exhaust air from which organic vapor has been removed to said paint applying enclosure.

3. The air handling system of claim 1, including means coupling said air exhaust means with said air inlet supply means for returning a portion of said exhaust air flow having organic vapors therein to said paint applying enclosure.

4. An air handling system for a paint applying enclosure wherein organic solvent base paint application processes are conducted, said air handling system comprising:
   air inlet supply means for introducing a flow of fresh air into said enclosure;
   air exhaust means for causing an exhaust air flow from said enclosure, said exhaust means including paint solid removal means for removing paint solids from said exhausted air flow to provide filtered exhaust air;
   vapor removal means for removing organic vapor from said filtered exhaust air, including means for producing contact between an organic vapor absorber liquid and the filtered exhaust air;
   regenerator means coupled with said vapor removal means for removing absorbed organics from said absorber liquid to regenerate said absorber liquid; and
   means coupled with said regenerator means for recirculating regenerated absorber liquid to said means for producing contact;
   said means for producing contact comprising:
   (1) spray means coupled with the liquid source for producing a spray of said liquid,
   (2) baffle means at least partially circumscribing said spray means for increasing atomization of said liquid in said filtered exhaust air, said baffle means having a plurality of apertures therein opposing said spray means for receiving liquid delivered by said spray means therethrough and an opening on one end thereof for receiving said filtered exhaust air therewithin,
   (3) coalescing means on the opposite end of said baffle means for collecting atomized drops of said liquid, and
   (4) eliminator means communicating with said coalescing means for carrying collected liquid away from said contact producing means.

5. The air handling system according to claim 4, wherein said spray means comprises a liquid distribution tube having a plurality of longitudinally spaced apertures therein and said baffle means includes an inner longitudinally extending baffle wall surrounding said tube and radially spaced therefrom.

6. The air handling system according to claim 5, wherein said baffle means comprises an outer baffle wall radially spaced from said inner wall defining a longitudinally extending annular conduit, and said coalescing means comprises a pad pervious to the passage of air therethrough.

* * * * *